US008610981B2

(12) United States Patent
 Ohkawa

(10) Patent No.: US 8,610,981 B2
(45) Date of Patent: Dec. 17, 2013

(54) DEVICE, METHOD, AND COMPUTER-READABLE STORAGE MEDIUM FOR CORRECTING TONE IN AN IMAGE

(75) Inventor: Mieko Ohkawa, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 860 days.

(21) Appl. No.: 12/767,599

(22) Filed: Apr. 26, 2010

(65) Prior Publication Data

US 2010/0271673 A1 Oct. 28, 2010

(30) Foreign Application Priority Data

Apr. 28, 2009 (JP) ................. 2009-108986

(51) Int. Cl.
 *G03F 3/08* (2006.01)
(52) U.S. Cl.
 USPC ........... 358/518; 358/1.9; 358/3.23; 358/501; 382/162; 382/167
(58) Field of Classification Search
 USPC ............... 358/1.9, 3.01, 3.02, 3.23, 501, 518; 382/162, 167
 See application file for complete search history.

(56) References Cited

U.S. PATENT DOCUMENTS

| | | | |
|---|---|---|---|
| 7,564,602 B2 | 7/2009 | Ota et al. | |
| 2007/0153340 A1* | 7/2007 | Itagaki et al. | 358/504 |
| 2008/0018918 A1* | 1/2008 | Ozaki et al. | 358/1.9 |
| 2008/0144060 A1* | 6/2008 | Ishikawa | 358/1.9 |
| 2008/0159763 A1 | 7/2008 | Nakane | |
| 2009/0027705 A1 | 1/2009 | Ozaki et al. | |

FOREIGN PATENT DOCUMENTS

| | | |
|---|---|---|
| JP | 2-199964 | 8/1990 |
| JP | 2006-237987 | 9/2006 |
| JP | 2007-189278 | 7/2007 |
| JP | 2007-264364 | 10/2007 |
| JP | 2007-264371 | 10/2007 |
| JP | 2008-154115 | 7/2008 |

OTHER PUBLICATIONS

Japanese Office Action issued in corresponding Japanese Application No. 2009-108986, dated Dec. 18, 2012.

\* cited by examiner

*Primary Examiner* — King Poon
*Assistant Examiner* — Jamares Q Washington
(74) *Attorney, Agent, or Firm* — Finnegan, Henderson, Farabow, Garrett & Dunner, L.L.P.

(57) ABSTRACT

Disclosed is an image processing device comprising: a storage part to store a target value set for each tone value in a plurality of colors; a measurement value information obtaining part to obtain measurement value information, the measurement value information comprising a measurement value of a density at each of a plurality of measurement positions in a main and a sub-scanning directions; a correction target value calculation part to correct the target value based on color mixture proportion information where a proportion of the colors is set, and to calculate a correction target value; a correction value calculation part to calculate a correction value of the density at each measurement position, which is calculated based on the correction target value and the measurement value information; and a correction part to correct a density value of each pixel in image data, based on the correction value.

30 Claims, 11 Drawing Sheets

FIG.7

| SUB-SCANNING POSITION \ MAIN SCANNING POSITION | X1 | X2 | X3 | X4 | X5 | ... | X14 | ... |
|---|---|---|---|---|---|---|---|---|
| Y1 | - | 126 | - | - | - | ... | 126 | ... |
| Y2 | - | - | - | - | - | ... | - | ... |
| Y3 | - | 127 | - | - | - | ... | 127 | ... |
| Y4 | - | - | - | - | - | ... | - | ... |
| Y5 | 128 | 128 | 127 | - | 127 | ... | 126 | ... |
| ⋮ | ⋮ | ⋮ | ⋮ | ⋮ | ⋮ | ... | ⋮ | ... |
| Y21 | 128 | 128 | 129 | - | 128 | ... | 126 | ... |
| ⋮ | ⋮ | ⋮ | ⋮ | ⋮ | ⋮ | ... | ⋮ | ... |

FIG.8A

| PATCH IMAGE GROUP \ MAIN SCANNING POSITION | X1 | X2 | X3 | X4 | ... | X23 | MEASUREMENT AVERAGE VALUE |
|---|---|---|---|---|---|---|---|
| A SUB-SCANNING COORDINATE;Y5 | 128 | - | 127 | - | ... | 122 | 128 |
| B SUB-SCANNING COORDINATE;Y21 | 128 | - | 129 | - | ... | 120 | 126 |
| | | | | | TONE AVERAGE VALUE IN MAIN SCANNING DIRECTION → | | 127 |

FIG.8B

| PATCH IMAGE GROUP \ SUB-SCANNING POSITION | Y1 | Y2 | Y3 | Y4 | ... | Y31 | MEASUREMENT AVERAGE VALUE |
|---|---|---|---|---|---|---|---|
| C MAIN SCANNING COORDINATE;X2 | 126 | - | 127 | - | ... | 125 | 126 |
| D MAIN SCANNING COORDINATE;X14 | 126 | - | 127 | - | ... | 127 | 124 |
| | | | | | TONE AVERAGE VALUE IN SUB-SCANNING DIRECTION → | | 125 |

*FIG.10*

| SUB-SCANNING POSITION \ MAIN SCANNING POSITION | X1 | X2 | X3 | X4 | X5 | ... | X14 | ... |
|---|---|---|---|---|---|---|---|---|
| Y1 | - | 0 | - | - | - | ... | 0 | ... |
| Y2 | - | - | - | - | - | ... | - | ... |
| Y3 | - | +1 | - | - | - | ... | +1 | ... |
| Y4 | - | - | - | - | - | ... | - | ... |
| Y5 | +2 | +2 | +1 | - | +1 | ... | 0 | ... |
| ⋮ | ⋮ | ⋮ | ⋮ | ⋮ | ⋮ | ... | ⋮ | ... |
| Y21 | +2 | +2 | +3 | - | +2 | ... | 0 | ... |
| ⋮ | ⋮ | ⋮ | ⋮ | ⋮ | ⋮ | ... | ⋮ | ... |

DEVICE, METHOD, AND COMPUTER-READABLE STORAGE MEDIUM FOR CORRECTING TONE IN AN IMAGE

BACKGROUND OF THE INVENTION

1. Field of the Invention

The present invention relates to an image processing device, an image forming apparatus and an image processing method.

2. Description of Related Art

In recent years, there has been a problem in an image forming apparatus, such as a copying machine, a printer, and the like, that density unevenness (a density gradient) is generated in a main scanning direction or a sub-scanning direction in an image formed and output to a sheet. It is known that the factors for this density unevenness are the inclination of the mounting position of a laser unit, and the like, in an optical writing device; a variation in an optical path length; a distortion of a lens; a charging status of a photoconductive drum; the inclination of the mounting position thereof, and the like.

As such, according to Japanese Patent Application Laid-open Publication Nos. 2007-264371 and 2007-264364, the following technique to correct the density unevenness in an image is disclosed. That is, for example, patches having the same density are generated at a plurality of places which are respectively shifted in a direction perpendicular to a rotating direction on which an image carrier is rotated, and each density value of the generated patches is measured. Then, a corresponding relationship between the measured density and a density tone value of the patches is obtained, and the tone value input based on the obtained corresponding relation ship is converted, thereby a γ table is corrected.

However, when the density unevenness correction is performed in the image for each of the colors of C(cyan), M(magenta), Y(yellow) and K(black), the color mixture proportion of these four colors may be off-balanced. As a result, there has been a problem that the gray balance or the balance of coloration may be disturbed.

SUMMARY OF THE INVENTION

The present invention was made in view of the above described circumstances, and the objects of the present invention include, correcting the density unevenness without disturbing the balance of coloration in the color mixture generated by a plurality of colors.

To achieve at least one of the above objects, provided is an image processing device, reflecting one aspect of the present invention, comprising:

a storage part to store a target value set for each tone value in a plurality of colors, for each of the colors;

a measurement value information obtaining part to obtain measurement value information for each of the colors, the measurement value information comprising a measurement value of a density at each of a plurality of measurement positions in a main scanning direction and in a sub-scanning direction, the measurement positions being set for each tone value;

a correction target value calculation part to correct the target value based on color mixture proportion information in which a proportion of the plurality of colors is set for each tone value, and to calculate a correction target value for each tone value for each color;

a correction value calculation part to calculate a correction value of the density at each measurement position in the main scanning direction and in the sub-scanning direction set for each tone value, the correction value being calculated for each color based on the correction target value and the measurement value information; and a correction part to correct a density value of each color of each pixel in image data, based on the correction value of the density for each color, calculated by the correction value calculation part.

To achieve at least one of the above objects, provided is an image forming apparatus, reflecting another aspect of the present invention, comprising:

an image forming section to form a correction chart image on a sheet, in which a patch image having the same tone value is respectively disposed at each of the measurement positions in the main scanning direction and in the sub-scanning direction, and to output the sheet as a correction chart sheet for each color; and the image processing device.

To achieve at least one of the above objects, provided is an image processing method, reflecting still another aspect of the present invention, comprising:

obtaining of measurement value information for each of colors, the measurement value information comprising a measurement value of a density at each of a plurality of measurement positions in a main scanning direction and in a sub-scanning direction, the measurement positions being set for each tone value;

calculating of a correction target value to correct a target value set for each tone value for each color based on color mixture proportion information in which a proportion of the plurality of colors is set for each tone value, and to calculate the correction target value for each tone value for each color;

calculating of a correction value of the density at each measurement position in the main scanning direction and in the sub-scanning direction set for each tone value, the correction value being calculated for each color based on the correction target value and the measurement value information; and correcting a density value of each color of each pixel in image data, based on the correction value of the density for each color, calculated by the calculating of the correction value.

BRIEF DESCRIPTION OF THE DRAWINGS

These and other objects, advantages and features of the present invention will become more fully understood from the detailed description given hereinbelow and the appended drawings, and thus are not intended as a definition of the limits of the present invention, and wherein:

FIG. 7 is an image diagram of measurement value information;

FIG. 8A is a diagram showing a calculation example of a measurement average value and a tone average value in each main scanning direction when a tone value of Y(yellow) is 125;

FIG. 8B is a diagram showing a calculation example of the measurement average value and the tone average value in each sub-scanning direction when the tone value of Y(yellow) is 125;

FIG. 10 is an image diagram of a correction value table; and

DETAILED DESCRIPTION OF THE PREFERRED EMBODIMENT

In the following, the embodiment of the present invention is described in detail with reference to the drawings.

First, the configuration is explained.

Figure 1:
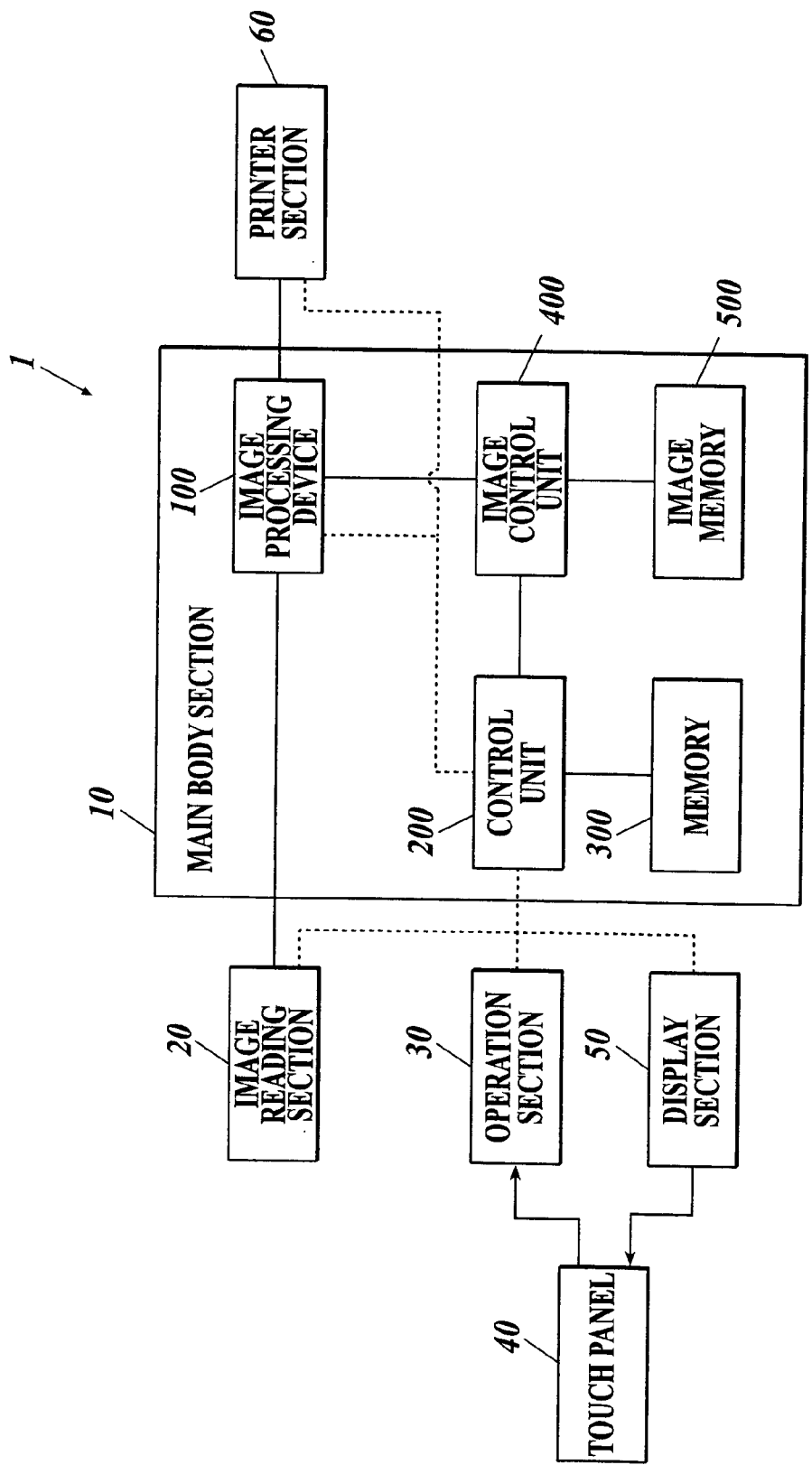
FIG. 1 is a functional configuration diagram of an image forming apparatus.

FIG. 1 shows a functional configuration diagram of an image forming apparatus 1.

As shown in FIG. 1, the image forming apparatus 1 comprises a maim body section 10, an image reading section 20, an operation section 30, a touch panel 40, a display section 50, a printer section 60, and the like. Further, the main body section 10 comprises an image processing device 100, a control unit 200, a memory 300, an image control unit 400, an image memory 500, and the like.

The image reading section 20 comprises a light source, a charge coupled device (CCD), an analog/digital (A/D) converter, and the like. When an image is read, the reflection light of the light provided from the light source scanning thought a document forms an image, and a photoelectric conversion is performed by the CCD, thereby the document image is read out to generate an image signal (an analog signal). Subsequently, the image signal is converted to digital color image data of an RGB color system by the A/D converter, so that the converted digital color image data is output to the image processing device 100 in the main body section 10. Here, the image is not limited to those such as a graphic and a photograph, but also includes character images such as a character and symbols, and the like.

Further, the image reading section 20 measures the density of a patch image located at each measurement position in the main scanning direction and in the sub-scanning direction as a measurement value, for each correction chart sheet. Here, in the chart sheet, a correction chart image is formed thereon for each color, in which the patch image having the same tone value is disposed at each measurement position in the main scanning direction and in the sub-scanning direction, respectively. Then, the image reading section 20 outputs the measurement results for each correction chart sheet as the measurement value information for each color to the image processing device 100. That is to say, the image reading section 20 functions as a measurement section.

The operation section 30 comprises various functional keypads such as a start keypad to instruct that the image forming is started on a sheet, numerical keypads, and the like. When these functional keypads or the touch panel 40 is operated, the operation section 30 outputs the corresponding operation signals to the main body control unit 200.

Still further, the operation section 30 or the screen displayed in the display section 50, and the touch panel 40 function as an input section to receive an input of adjustment value information (a CMYK color mixture proportion which will be discussed later) to calculate an adjustment value to adjust a respective target value set for each tone value, in the later described correction value calculation processing.

The display section 50 comprises a liquid crystal display (LCD) which is integrally formed with the touch panel 40, so as to display various operation screens on the LCD.

The printer section 60 performs image forming processing on a sheet based on the image data input from the image processing device 100 in the main body section 10, to output an image.

When for example an electrophotographic method is applied, the printer section 60 comprises an exposure unit which includes a photoconductive drum, a development unit to attach toners, a fixing unit to perform fixing processing of the toners, and the like. When an image is formed, the exposure unit writes an electrostatic latent image in the photoconductive drum based on image data, and the development unit attaches the toners to the photoconductive drum, thereby a toner image is formed. The toner image is transferred onto a sheet conveyed from a feeding tray. Subsequently, the sheet is conveyed to the fixing unit, and is subjected to the fixing processing so as to be output to a tray which is a specified ejection destination. Incidentally, the image forming method may be one other than the electrophotographic method.

Further, the printer section 60 functions as an image forming section to form the correction chart image, in which the patch image having the same tone value is disposed at each measurement position in the main scanning direction and in the sub-scanning direction, respectively, on a sheet, and to output the sheet as the correction chart sheet for each color.

Figure 2:
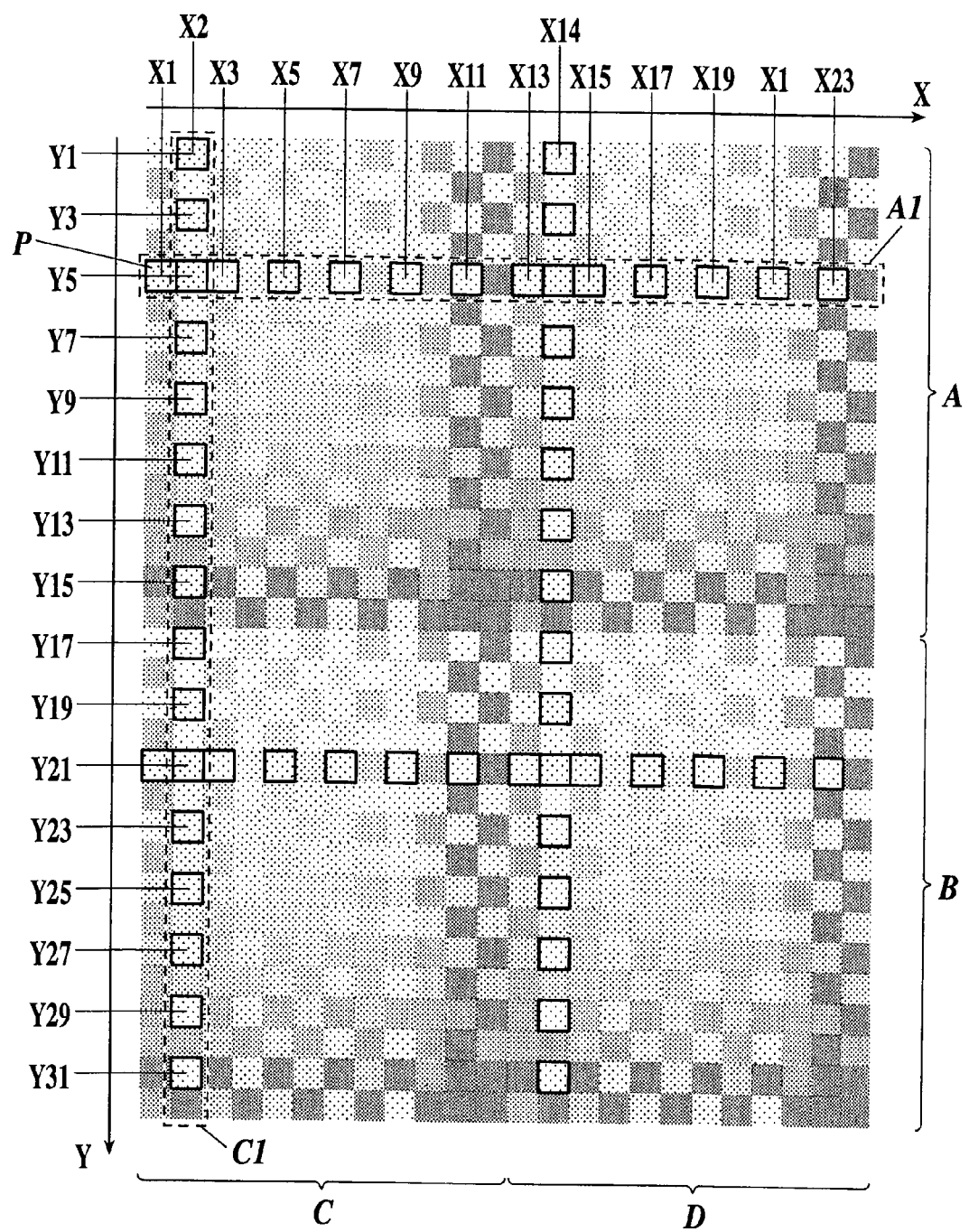
FIG. 2 is a diagram showing an example of a correction chart image.
Figure 3:
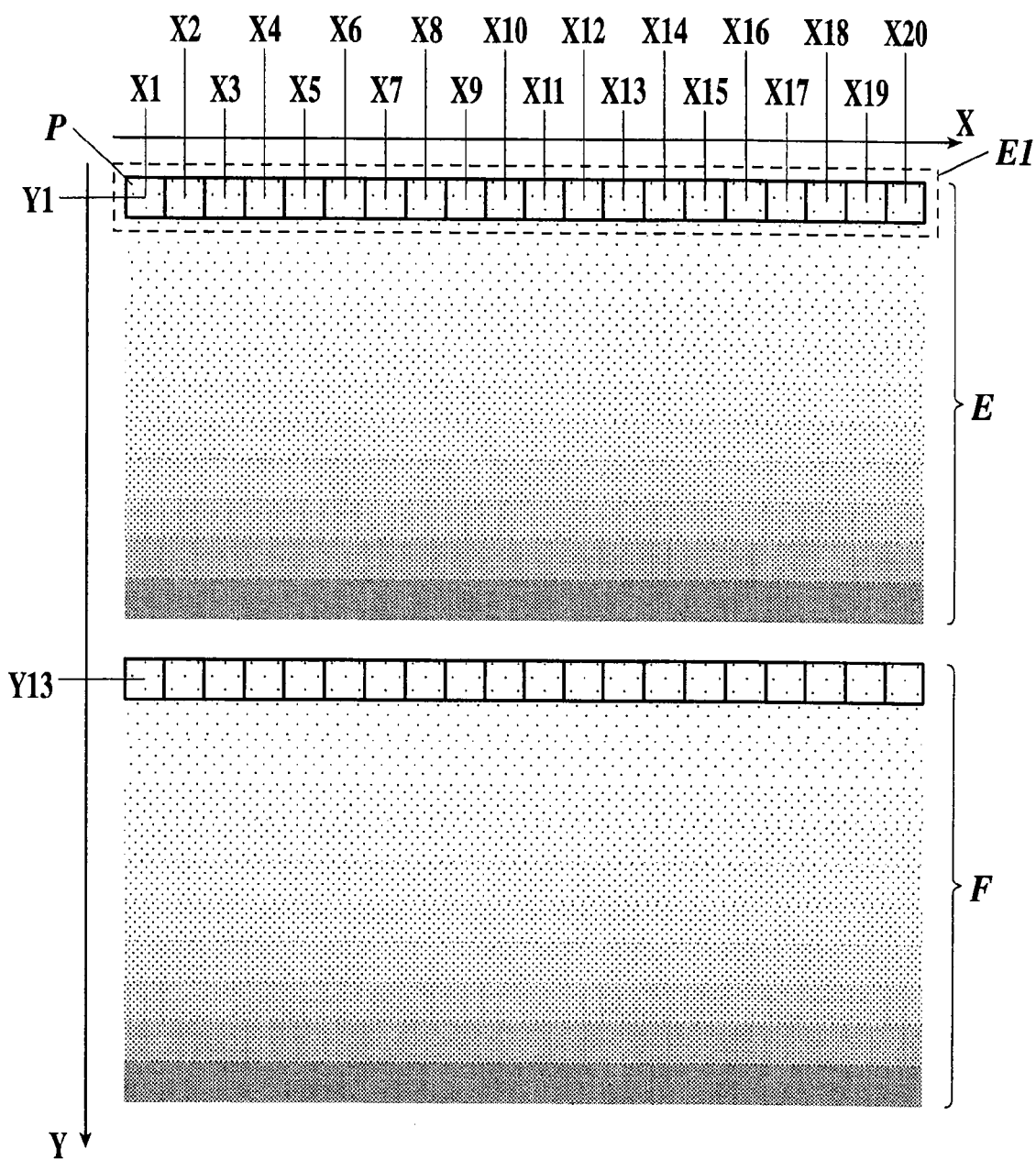
FIG. 3 is a diagram showing another example of a correction chart image.

FIGS. 2 and 3 show examples of the correction chart image.

The correction chart image shown in FIG. 2 comprises a first patch image group A, a second patch image group B, a third patch image group C and a fourth patch image group D.

The first patch image group A and the second patch image group B are images to measure the density value of the patch image having the same tone value in the main scanning direction. The first patch image group A and the second patch image group B are disposed adjacent to each other in the sub-scanning direction. The second patch image group B has the same configuration as the first patch image group A, thus the explanation thereof is omitted.

The first patch image group A comprises a plurality of patch lines, wherein patch images P having the same tone value are disposed in a state of being spaced out respectively with an interval corresponding to one patch image in the main scanning direction X, in each patch line (for example, there is a patch line A1 comprising the patch images whose respective positions are: position Y5 in the sub-scanning direction; and positions X1, X3, X5, . . . , X23 in the main scanning direction, respectively), and wherein the patch lines are disposed in a state of being spaced out respectively with an interval corresponding to one patch image in the sub-scanning direction Y. Here, each patch line has different tone value (density value) from each other.

The third patch image group C and the fourth patch image group D are images to measure the density value of the patch image having the same tone value in the sub-scanning direction. The third patch image group C and the fourth patch image group D are disposed adjacent to each other in the main scanning direction. The fourth patch image group D has the same configuration as the third patch image group C, thus the explanation thereof is omitted.

The third patch image group C comprises a plurality of patch lines, wherein patch images P having the same tone value are disposed in a state of being spaced out respectively with an interval corresponding to one patch image in the sub-scanning direction Y, in each patch line (for example, there is a patch line C1 comprising the patch images whose respective positions are: position X2 in the main scanning direction; and positions Y1, Y3, Y5, . . . , Y31 in the sub-scanning direction, respectively), and wherein the patch lines are disposed in a state of being spaced out respectively with an interval corresponding to one patch image in the main scanning direction X. Here, each patch line has different tone value (density value) from each other.

As shown in FIG. 2, the first patch image group A and the second patch image group B having the same configuration as the first patch image group A, are disposed adjacent to each other in the sub-scanning direction. Further, the third patch image group C and the fourth patch image group D having the same configuration as the third patch image group C, are disposed adjacent to each other in the main scanning direction. Thereby, a correction chart image is to be configured, in which the patch image having the same tone value is disposed at each measurement position in the main scanning direction X and in the sub-scanning direction Y.

For example, each of the patch images P having the tone value of 125 is disposed at each measurement position as follows. That is: position Y5 in the sub-scanning direction; and positions X1, X3, X5, . . . , X23 respectively in the main scanning direction, position Y21 in the sub-scanning direction; and positions X1, X3, X5, . . . , X23, respectively in the main scanning direction, position X2 in the main scanning direction; and positions Y1, Y3, Y5, . . . , Y31, respectively in the sub-scanning direction, position X14 in the main scanning direction; and positions Y1, Y3, Y5, . . . , Y31, respectively in the sub-scanning direction.

Incidentally, the measurement position applied in the present embodiment is a central coordinate of each patch image.

The correction chart image shown in FIG. 3 comprises a fifth patch image group E and a sixth patch image group F. The fifth patch image group E and the sixth patch image group F are disposed adjacent to each other in the sub-scanning direction. The sixth patch image group F has the same configuration as the first patch image group E, thus the explanation thereof is omitted.

The fifth patch image group E comprises a plurality of patch lines disposed adjacent to each other in the sub-scanning direction Y. For example, the patch line E1 as shown comprises patch images whose respective positions are: position Y1 in the sub-scanning direction; and positions X1-X20 in the main scanning direction, respectively. In each patch line, the plurality of patch images P having the same tone value are disposed adjacent to each other in the main scanning direction X. Further, each patch line has a different tone value (density value) from the adjacent patch lines, and each of the patch lines are disposed so that the density thereof is to be either gradually darkened or lightened, along the sheet conveying direction (which is the sub-scanning direction Y).

As shown in FIG. 3, the fifth patch image group E and the sixth patch image group F having the same configuration as the fifth patch image group E, are disposed adjacent to each other in the sub-scanning direction Y. Thereby, a correction chart image is to be configured, in which the patch image having the same tone value is disposed at each measurement position in the main scanning direction X and in the sub-scanning direction Y.

For example, patch images P having the tone value of 125 are disposed at each measurement position as follows: positions X1-X20 in the main scanning direction, respectively; position Y1 in the sub-scanning direction, and positions X1-X20 in the main scanning direction, respectively; position Y13 in the sub-scanning direction.

Next, each section in the main body 10 will be explained.

As shown in FIG. 1, the main body section 10 comprises an image processing device 100, a control unit 200, a memory 300, an image control unit 400, an image memory 500, and the like.

The control unit 200 comprises a central processing unit (CPU), a random access memory (RAM), and the like, and controls each section in the image forming apparatus 1 in a centralized manner according to various control programs stored in the memory 300. Further, the control unit 200 performs various calculations. For example, the control unit 200 performs processing controls such as switching of the modes of copying, printing, scanning; instructing the image reading section 20 to read out a document; storing image data in the image memory 500; outputting the image data to the printer section 60, and the like, according to the operation signals input from the operation section 30.

Further, the control unit 200 outputs adjustment value information (which is the CMYK color mixture proportion) received by the touch panel 40 or various keypads in the operation section 30 to the image processing device 100.

The memory 300 stores various programs, files and data necessary to execute the programs, and the like.

The image control unit 400 controls the input and output of image data to and from the image memory 500 in accordance with the control performed by the control unit 200.

The image memory 500 comprises a dynamic random access memory (DRAM), a hard disk, and the like to configure a compressed memory region and a page memory region. The compressed memory region is a region to store image data which has been processed by the image processing device 100, and the page memory region is a region to temporarily store image data which is an object of the image forming, before the forming of the image.

Next, the image processing device 100 is described.

Figure 4:
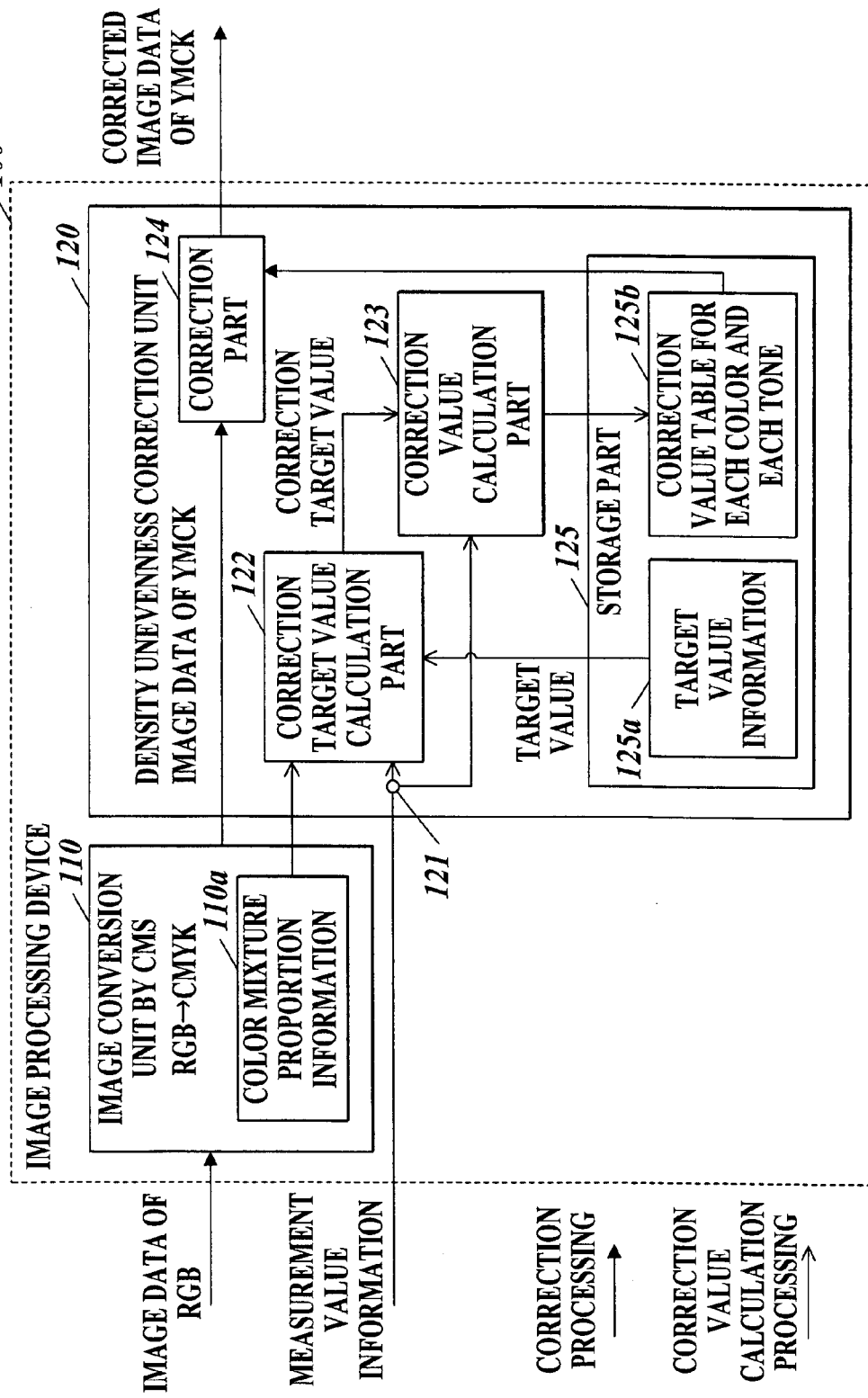
FIG. 4 is a diagram showing a configuration of an image processing device.

FIG. 4 shows a configuration of the image processing device 100 according to the present embodiment.

As shown in FIG. 4, the image processing device 100 comprises a color conversion unit 110, a density unevenness correction unit 120, and the like. The image processing device 100 according to the present embodiment executes the later described correction value calculation processing and the correction processing, according to the instruction from the control unit 200.

The color conversion unit 110 comprises color mixture proportion information 110a. The color conversion unit 110 performs color conversion processing to convert input image data of RGB to image data of CMYK, based on the color mixture proportion information 110a, so as to output the converted image data of CMYK to a correction part 124 in the density unevenness correction unit 120.

A proportion of a plurality of colors (CMYK) for each tone value is set among a plurality of tone values having been set in advance, as the color mixture proportion information. The color mixture proportion information may be referred to as gray balance information, black print curve information, or the like.

Figure 5:
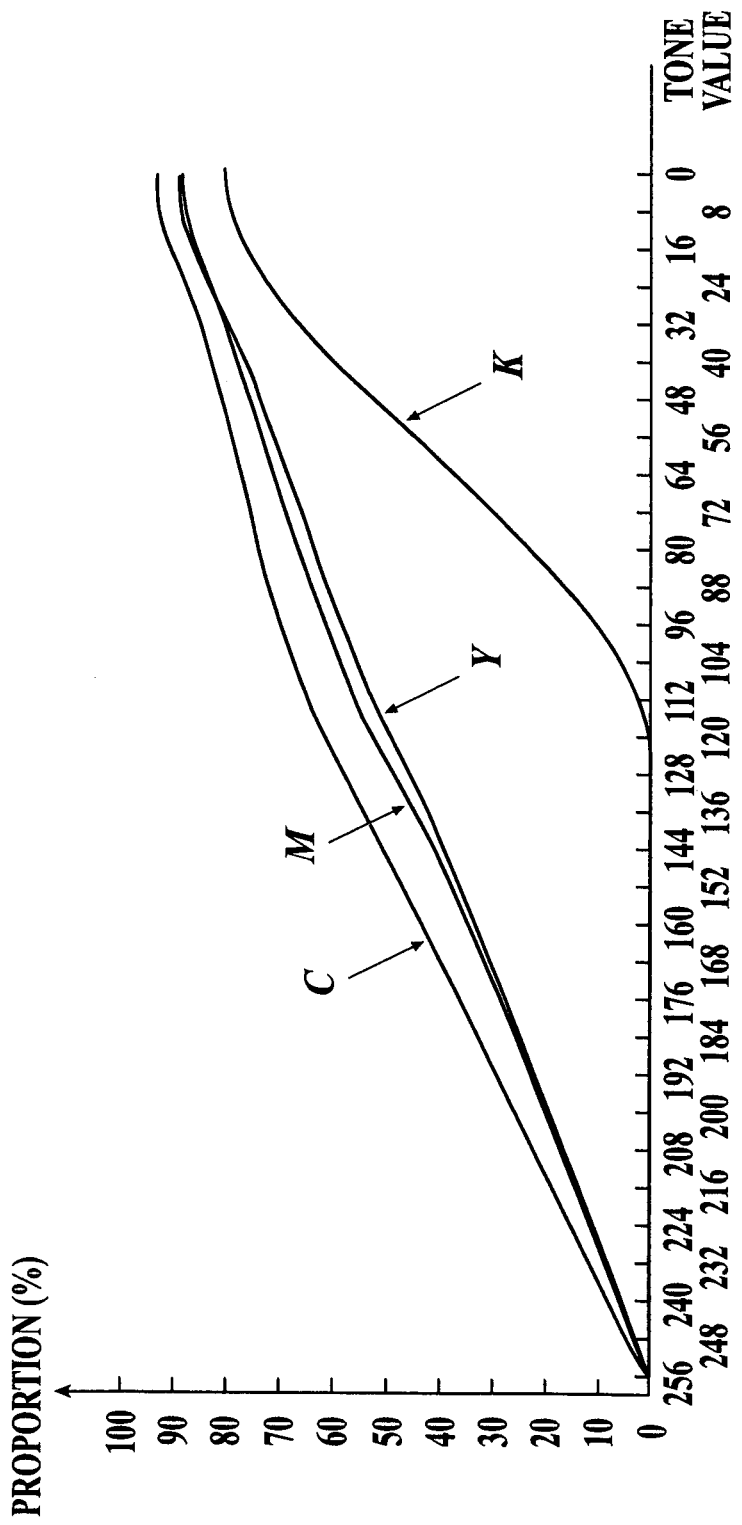
FIG. 5 is a diagram showing an example of black print curve information as color mixture proportion information.

FIG. 5 shows an example of the black print curve information as the color mixture proportion information.

In the black print curve information shown in FIG. 5, the horizontal axis represents the tone value, and the vertical axis represents the proportion [%] of each color to the maximum output tone density value. For example, when the tone value is 72, the following conditions are set: C(cyan) is 75%, M(magenta) is 70%, Y(yellow) is 65% and K(black) is 30%.

The density unevenness correction unit 120 comprises a measurement value information obtaining part 121, a correction target value calculation part 122, a correction value calculation part 123, a correction part 124, a storage part 125, and the like.

Incidentally, the measurement value information obtaining part 121, the correction target value calculation part 122, the correction value calculation part 123 and the correction part 124 are configured by software or hardware.

The measurement value information obtaining part 121 obtains measurement value information input from the image reading section 20 or an external measurement device through the control unit 200 for each color, so as to output the obtained measurement value information for each color to the correction target value calculation part 122 and the correction value calculation part 123.

The correction target value calculation part 122 corrects the target value set for each tone value of each color, based on the measurement value information of each color and the color mixture proportion information, to calculate the correction target value for each tone value for each color, so as to output the correction target value calculated for each tone value for each color to the correction value calculation part 123.

The correction value calculation part 123 calculates the correction value of density for each color in each measurement position in the main scanning direction and in the sub-scanning direction set for each tone value, based on the correction target value for each tone value for each color input from the correction target value calculation part 122 and on the measurement value information for each tone value for each color, so as to generate a correction value table of each tone value for each color and to store the generated correction value table in the storage part 125.

The correction part 124 corrects the density value of each color for each pixel in the image data which has been subjected to the color conversion processing by the color conversion unit 110, based on the correction value table of each tone value for each color stored in the storage part 125, so as to output the corrected image data to the printer section 60.

The storage part 125 is a recording medium with nonvolatility, and functions as a storage part to store the target value information 125a and the correction value table 125b of each tone value for each color. The target value information 125a is the target value set for each tone value for each color, and is information of the density value which is predetermined for each tone value for each color.

Next, the operation in the present embodiment will be explained.

Figure 6:
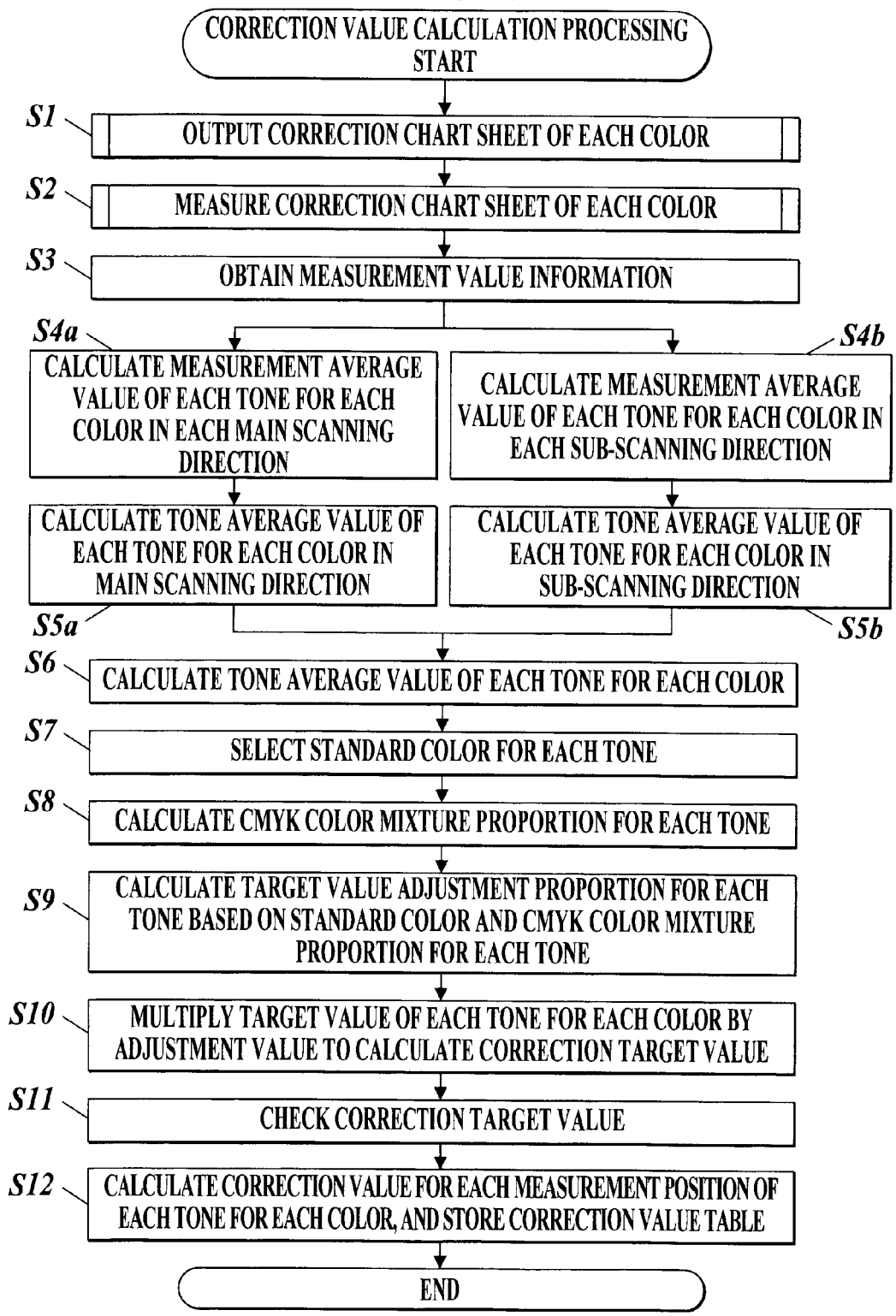
FIG. 6 is a flow chart of correction value calculation processing.

FIG. 6 shows a flow chart of the correction value calculation processing according to the present embodiment.

The present processing is executed by each unit in the image processing device 100 in cooperation, according to the instruction from the control unit 200.

First, when an instruction of the correction value calculation processing is input through the operation section 30 or the touch panel 40, the correction chart sheet of each color is output by the printer section 60 (step S1).

Incidentally, the correction chart sheet of each color used in the present embodiment is the one in which the correction chart images are formed thereon for each color as shown in FIG. 2.

Then, in the correction chart sheet of each color, the density of a patch image at each measurement position in the main scanning direction and in the sub-scanning direction is measured as the measurement value, for each correction chart sheet (step S2), thereby the measurement results are obtained for each color as the measurement value information by the measurement value information obtaining part 121 (step S3).

The measurement of the correction chart sheet in step S2 is obtained by the image data of the correction chart sheet of each color being read by the image reading section 20 in the present embodiment, however, the measurement is not limited to this. For example, a measurement device to measure the correction chart sheet and to generate the correction value information, for its exclusive use may alternatively be applied. As such measurement device, "iliSis" (manufactured by "X-Rite"), "ilXTreme" (manufactured by "X-Rite"), and the like, may for example be cited.

FIG. 7 shows an image diagram of the measurement value information.

The image diagram of the measurement value information shown in FIG. 7 is an example of the measurement value information where the color is Y(yellow), and the tone value is 125, in a case where the correction chart sheet is used, in which the correction chart images shown in FIG. 2 are formed. The patch images respectively surrounded by a square (□) shown in FIG. 2 is supposed to be the patch images whose color is yellow and whose tone value is 125. In this case, the respective measurement position of the patch images in which the color is Y(yellow) and the tone value is 125 is as follows: position Y5 in the sub-scanning direction; and positions X1, X3, X5, . . . , X23 respectively in the main scanning direction, position Y21 in the sub-scanning direction; and positions X1, X3, X5, . . . , X23, respectively in the main scanning direction, position X2 in the main scanning direction; and positions Y1, Y3, Y5, . . . , Y31, respectively in the sub-scanning direction, position X14 in the main scanning direction; and positions Y1, Y3, Y5, . . . , Y31, respectively in the sub-scanning direction. The measurement values of the density at each measurement position are obtained as the measurement value information in which the color is Y(yellow) and the tone value is 125.

Incidentally, at positions where the measurement values cannot be obtained (for example, the position of: the position X1 in the main scanning direction; the position Y1 in the sub-scanning direction), the measurement value thereof is indicated as "–".

When the measurement value information for each tone value for each color is obtained, the correction target value calculation part 122 calculates the measurement average value of each tone value for each color in each main scanning direction (step S4a), and also calculates the measurement average value of each tone value for each color in each sub-scanning direction (step S4b).

Further, in the correction target value calculation part 122, the average value of the measurement average value in each main scanning direction for each tone value is calculated as the tone average value in the main scanning direction for each tone value for each color (step S5a). Further, the average value of the measurement average value in each sub-scanning direction for each tone value is calculated as the tone average value in the sub-scanning direction for each tone value for each color (step S5b).

In the correction target value calculation part 122, the average value of the tone average value in the main scanning direction and the tone average value in the sub-scanning direction is calculated for each tone value, thereby the calculated average value is obtained as the tone average value for each tone value for each color (step S6).

FIG. 8A shows a calculation example of the measurement average value of each main scanning direction and the tone average value obtained therefrom when the color is Y(yellow) and the tone value is 125, and FIG. 8B shows a calculation example of the measurement average value of each sub-scanning direction and the tone average value obtained therefrom when the color is Y(yellow) and the tone value is 125.

As shown in FIG. 8A, the average value of the measurement value at each measurement position (X1, X3, X5, ..., X23) in the main scanning direction where the sub-scanning coordinate is Y5 in the first patch image group A is calculated as the measurement average value. In the same manner, the average value of the measurement value at each measurement position (X1, X3, X5, ..., X23) in the main scanning direction where the sub-scanning coordinate is Y21 in the second patch image group B is calculated as the measurement average value. Then, the average value of the measurement average value for the first patch image group A and the measurement average value for the second patch image group B is calculated as the tone average value in the main scanning direction in which the color is Y(yellow) and the tone value is 125.

Further, as shown in FIG. 8B, the average value of the measurement value at each measurement position (Y1, Y3, Y5, ..., Y31) in the sub-scanning direction where the main scanning coordinate is X2 in the third patch image group C is calculated as the measurement average value. In the same manner, the average value of the measurement value at each measurement position (Y1, Y3, Y5, ..., Y31) in the sub-scanning direction where the main scanning coordinate is X14 in the fourth patch image group D is calculated as the measurement average value. Then, the average value of the measurement average value for the third patch image group C and the measurement average value for the fourth patch image group D is calculated as the tone average value in the sub-scanning direction in which the color is Y(yellow) and the tone value is 125.

Then, the average value of the tone average value in the main scanning direction and the tone average value in the sub-scanning direction in which the color is Y(yellow) and the tone value is 125 is calculated as the tone average value where the color is Y(yellow) and the tone value is 125. The tone average values are calculated for other colors and other tone values in the same manner.

When the tone average value is calculated for each tone value for each color, the correction target value calculation part 122 selects a standard color for each tone value (step S7).

In step S7, for example, the correction target value calculation part 122 determines and selects the color having the tone average value which is the nearest to the target value of each tone value as the standard color, or alternatively selects the color which is previously set for each tone value as the standard color, and the like, for each tone value.

The correction target value calculation part 122 calculates the proportion of each color (C(cyan):M(magenta):Y(yellow):K(black)) in the tone value (which is the CMYK color mixture proportion) for each color (step S8).

In step S8, the correction target value calculation part 122 obtains the color mixture proportion information 110a from the color conversion unit 110 to calculate the CMYK color mixture proportion for each tone value based on the obtained color mixture proportion information. For example, when the black print curve information shown in FIG. 5 is used as the color mixture proportion information, and when the tone value is 72, the proportion is to be C(cyan); 75%, M(magenta); 70%, Y(yellow); 65% and K(black); 30%. As such, the CMYK color mixture proportion when the tone value is 72 is to be C:M:Y:K=15:14:13:6.

Further, in step S8, when the CMYK color mixture proportion which is input from the CMYK color mixture proportion setting screen, and the like, in advance is stored in the storage part 125, the stored CMYK color mixture proportion may alternatively be used as the CMYK color mixture proportion for each tone value.

Figure 9:
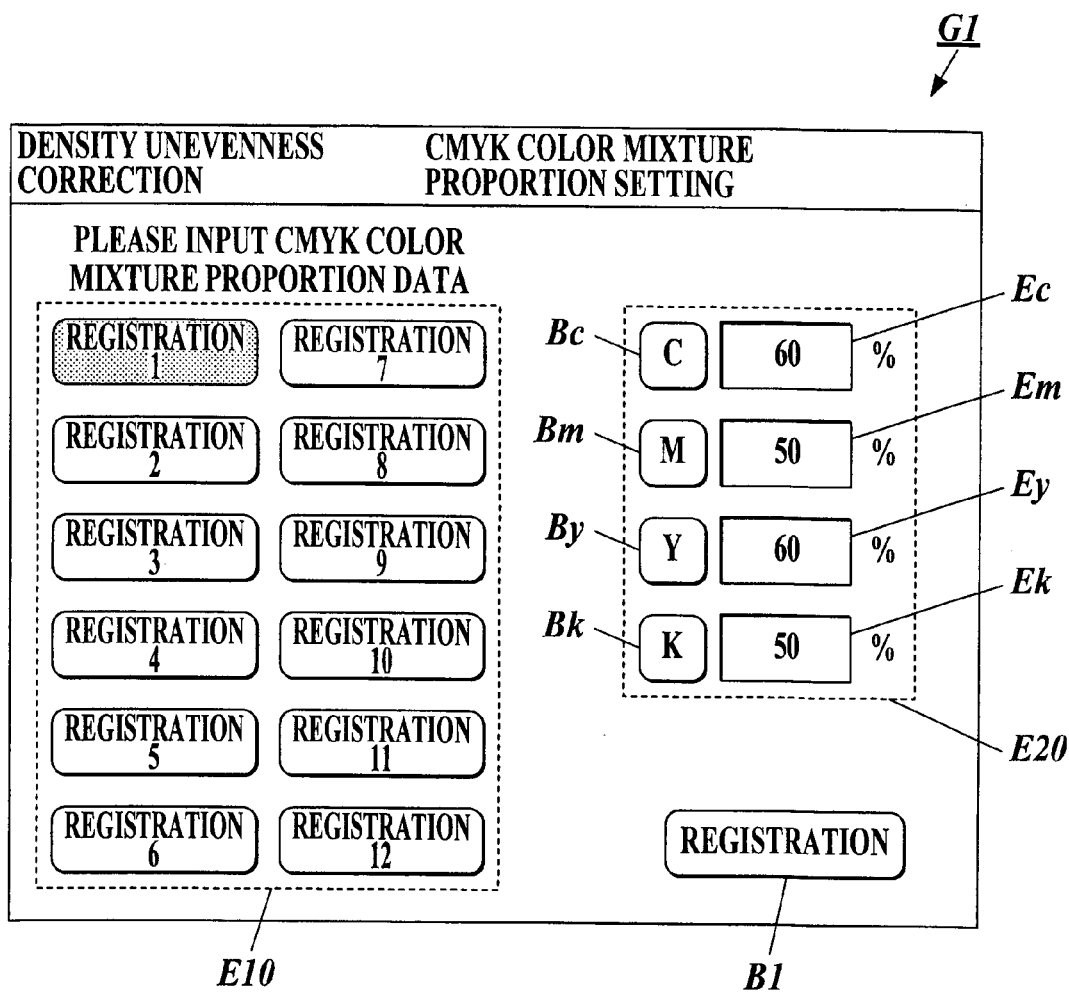
FIG. 9 is a diagram showing an example of a CMYK color mixture proportion setting screen.

FIG. 9 shows an example of the CMYK color mixture proportion setting screen.

The CMYK color mixture proportion setting screen G1 shown in FIG. 9 comprises a registration data selection region E10, a CMYK color mixture proportion display region E20, a registration button B1, and the like.

The registration data selection region E10 comprises a plurality of registration data selection buttons. When any one of the registration data selection buttons is depressed, the CMYK color mixture proportion which is stored in a state of corresponding to the depressed registration data selection button is read out from the storage part 125, so as to be displayed in the CMYK color mixture proportion display region E20.

The CMYK color mixture proportion display region E20 comprises regions Ec, Em, Ey and Ek where the proportion of C(cyan), M(magenta), Y(yellow) and K(black) corresponding to the registration data selection buttons to be depressed is respectively displayed; and buttons Bc, Bm, By and Bk which are selectable for each color. When a button to select any one of the colors and a numerical value is input from numerical keypads, and the like, the input numerical value is displayed as the proportion corresponding to the color of the selected button.

When the registration button B1 is depressed, the CMYK color mixture proportion displayed in the CMYK color mixture proportion display region E20 is stored in the storage part 125 in a state of corresponding to the selected registration data selection button.

Then, an adjustment value (target value adjustment proportion) to respectively adjust the target value set for each tone value is calculated, based on the standard color for each tone value and on the CMYK color mixture proportion for each tone value, by the correction target value calculation part 122 (step S9).

In step S9, for example, in a case where the tone value is 72 and the standard color is Y(yellow), when the CMYK color mixture proportion is C:M:Y:K=15:14:13:6, and supposing that the proportion value of Y is 1 (the standard), C:M:Y:K=1:14/15:13/15:2/5 is calculated as the target value adjustment proportion. The proportion of each color in the target adjustment proportion for each tone value is to be the adjustment value in each tone value for each color.

Accordingly, the CMYK color mixture proportion setting screen functions as an input section to receive the input of the adjustment value information (CMYK color mixture proportion) to calculate the adjustment value to respectively adjust the target value being set for each tone value, for each color.

The target value for each tone value is read out for each color from the target value information stored in the storage part 125, so that the target value for each tone value is multiplied by the adjustment value for each color, thereby the correction target value for each tone value is calculated for each color, by the correction target value calculation part 122 (step S10).

In step S10, for example, in a case where the color is Y(yellow) and the tone value is 72, when the target value is 72 and the target value adjustment proportion is C:M:Y:K=1:14/15:13/15:2/5, the correction target value where the color is Y(yellow) and the tone value is 72 is to be the value obtained by multiplying the target value 72 by the adjustment value 13/15, which is 62.4.

When the correction target value for each tone value is calculated for each color, the correction target value check is performed for each color by the correction target value calculation part 122 (step S11).

In step S11, the following processing is performed for each color.

First, the calculated correction target values for each tone value are arranged in the order of the tone value.

Then, the relationship between a correction target value for each tone value and correction target values placed adjacent to the correction target value, respectively having the former and latter tone value in the tone value order, is judged whether they are equivalent or in converse relation, or not.

When the relationship between a correction target value for each tone value and correction target values placed adjacent to the correction target value, respectively having the former and latter tone value in the tone value order, is equivalent or in converse relation, the correction target value of each tone value is performed with a correction, so that the tone value difference of the tone values adjacent to each other which are equivalent or in converse relation is to be no less than 1 tone value.

After step S11, the calculated correction target value for each tone value for each color is output to the correction value calculation part 123. In the correction value calculation part 123, the correction value corresponding to each measurement position for each tone value in the measurement value information for each color is calculated, so that the calculated correction values for each tone value are stored in the storage part 125 for each color as the correction value table (step S12), thereby the present processing is terminated.

In step S12, the difference value between the measurement value of the density in each measurement position for each tone value and the correction target value for each tone value is calculated for each color. The obtained difference value for each tone value calculated for each color is to be the correction value corresponding to the density in each measurement position for each tone value.

FIG. 10 shows an image diagram of the correction value table.

The image diagram of the correction value table shown in FIG. 10 is an example in the case of the measurement value information where the color is Y(yellow) and the tone value is 125 shown in FIG. 7; and the color is Y(yellow) and the correction target value of the tone value of 125 is 126.

As shown in FIG. 10, in each measurement position where the color is Y(yellow) and the tone value is 125, the difference between the measurement value and the correction target value is calculated as the correction value. For example, in the measurement position where the position in the main scanning direction is X2 and the position in the sub-scanning direction is Y1, the measurement value is 126 as shown in FIG. 7, thereby the difference value from the correction target value is 0, thus the correction value is calculated to be 0.

Incidentally, in the position where the measurement value has not been obtained (for example, the position of: the position X1 in the main scanning direction; the position Y1 in the sub-scanning direction), there is no measurement value, thus the correction value cannot be calculated from the measurement value and the correction target value. Thus the correction value in such a case is indicated by "−".

Figure 11:
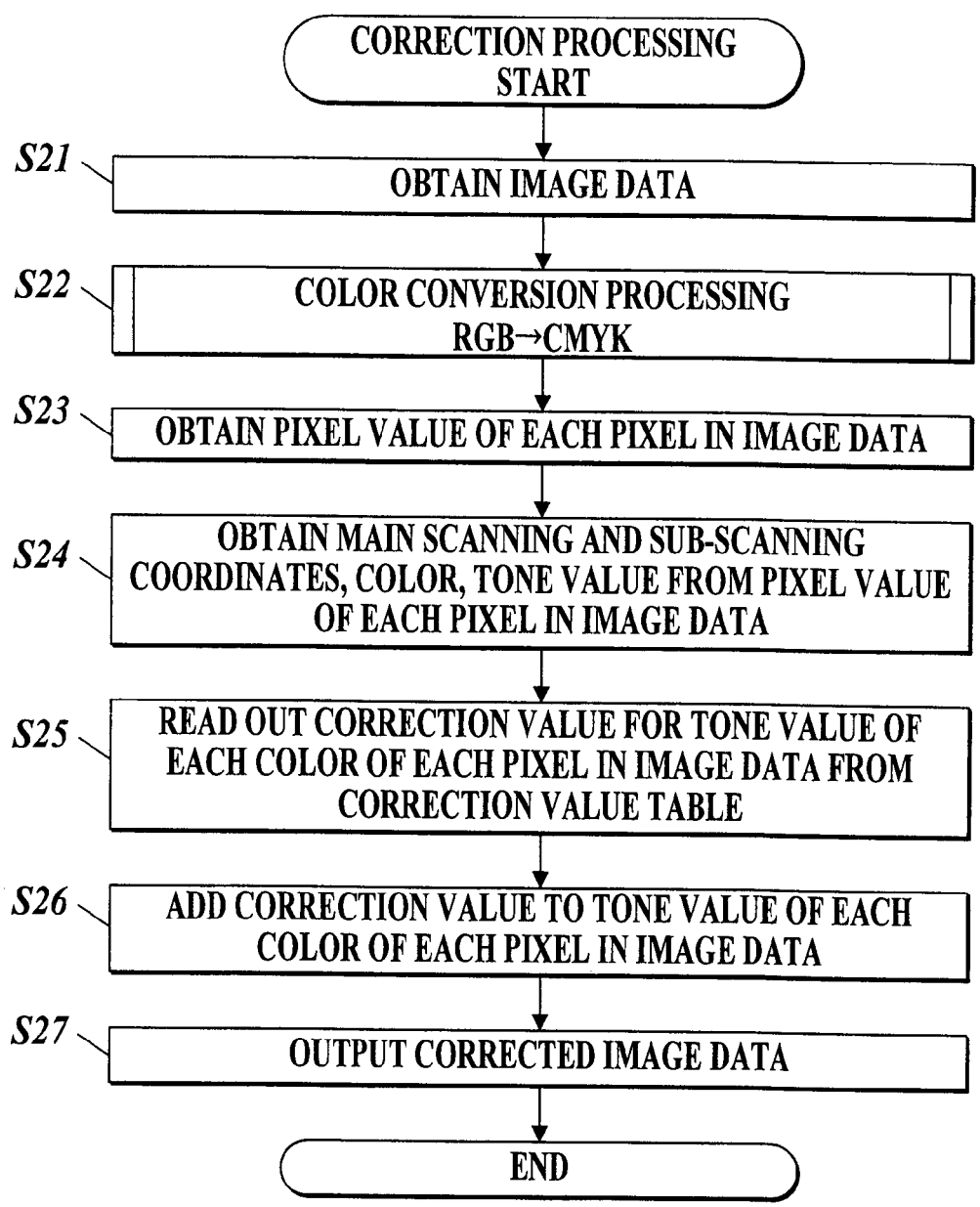
FIG. 11 is a flow chart of correction processing.

FIG. 11 shows a flow chart of the correction processing according to the present embodiment.

This processing is executed by each unit in the image processing device 100 in cooperation, according to the instruction from the control unit 200.

First, when image data of RGB is input to the color conversion unit 110 from the image reading section 20 so that the input image data is obtained (step S21), the color conversion processing to convert the colors in the image data of RGB to the image data of CMYK, based on the color mixture proportion information, in the color conversion unit 110 (step S22).

Then, the image data of CMYK is input to the correction part 124. The pixel value of each pixel in the image data input to the correction part 124 is obtained (step S23).

In the correction part 124, the position in the main scanning direction and in the sub-scanning direction, the color, the density value (the tone value) of each pixel is obtained from the pixel value of each pixel in the obtained image data (step S24).

The correction value table of the color and the tone value corresponding to the color and the density value (the tone value) of each pixel is referred to, so that the correction value corresponding to the position in the main scanning direction and in the sub-scanning direction of the pixel is read out (step S25).

In step S25, when there is no correction value of the density value (the tone value) of the color corresponding to the position of each pixel in the main scanning direction and in the sub-scanning direction, linear interpolation processing is executed, in which the correction value of the density of each color at each measurement position in the correction value table corresponding to the color and the density value (the tone value) not having the correction value, is used, thereby the correction value is calculated.

In the correction part 124, the tone value for each color in each pixel in the image data is added with the correction value which is either read out from the correction value table or calculated therefrom (step S26). Then, the image data in which the tone value for each color in each pixel is added with the correction value is output to the printer section 60 as the corrected image data (step S27), thereby the present processing is terminated.

As described above, according to the present embodiment, in the plurality of tone values which are previously set, the correction value of the density in each measurement position set for each tone value in the main scanning direction and in the sub-scanning direction is calculated for each color based on: (i) the correction target value for each tone value for each color, in which the target value set for each tone value is corrected for each color, based on the color mixture proportion information in which the proportion of the plurality of colors are set for each tone value, and on: (ii) the measurement value information for each color comprising the measurement values of the density in each measurement position among the plurality of measurement positions set for each tone value in the main scanning direction and in the sub-scanning direction. Thereby the density value of a pixel of each color in the image data can be corrected by using the obtained correction value. Accordingly, the density unevenness in the image comprising each color can be corrected without disturbing the coloration balance in the color mixture generated by the plurality of colors, which is the balance of the color mixture proportion in the plurality of colors.

Specifically, the difference value of the correction target value of each tone value and the measurement value of the density in each measurement position set for each tone value in the main scanning direction and in the sub-scanning direction, is calculated for each color. Thus, the calculated difference value for each color may be obtained as the correction value of the density for each color in each measurement position set for each tone value in the main scanning direction and in the sub-scanning direction. Thus, the density value can be corrected for each color for each pixel according to the position of the pixel in the main scanning direction and in the sub-scanning direction in the image data for each color, thereby the correction for unevenness can be improved to have higher accuracy.

Further, the target value for each tone value is multiplied by the adjustment value of the target value for each tone value based on the color mixture proportion information, for each color, thereby the correction target value for each tone value can be calculated for each color.

The adjustment value of the target value may be calculated from the color mixture proportion information in a state where the color having the tone average value which is the nearest to the target value of each color for each tone value is set as the standard color. Alternatively, the adjustment value of the target value for each tone value may be calculated for each color, in a state where the standard color is previously set for each tone value as the standard.

Further, the target value of each tone value may be multiplied by the adjustment value of the target value for each tone value which is calculated based on the adjustment value information (CMYK color mixture proportion) input from the CMYK color mixture proportion setting screen, thereby the correction target value for each tone value can be calculated for each color. Accordingly, the density unevenness in the image of each color can be corrected in accordance with the coloration balance which a user desires.

Moreover, when the relationship between the correction target value of each tone and the correction target values of the adjacent tone values is equivalent or in converse relation, the correction target value can be performed with correction so that the difference of not less than 1 tone value is generated. Accordingly, after the target value is corrected, the correction target value can be calculated in the same order as the order of each tone value of each color. Further, the correction target value of each tone value can be prevented from being equivalent or in converse relation with the correction target values of the adjacent tone values, thereby the tone density variation of the correction target values may be smoothed.

Further, regarding the correction chart sheet for each color in which the correction chart image is formed thereon where the patch images having the same tone value are disposed at each measurement position in the main scanning direction and in the sub-scanning direction, the density of each patch image in each measurement position in the main scanning direction and in the sub-scanning direction for each correction chart sheet is measured as the measurement value, thereby the measurement value information may be obtained. Accordingly, the measurement value for each tone value for each color can be obtained at each of the plurality of measurement positions in the main scanning direction and in the sub-scanning direction.

Further, the correction value of the density corresponding to the position of the pixel in the main scanning direction and in the sub-scanning direction of each color in the image data can be calculated for each color, by executing the linear interpolation processing in which the correction value of the density in each measurement position set for each tone value in the main scanning direction and in the sub-scanning direction is used.

Further, the measurement results of the density of the patch images at each measurement position in the main scanning direction and in the sub-scanning direction in the correction chart sheet for each color can be obtained as the measurement value information for each color by the image reading section, without using a device exclusively applied to measuring the correction chart sheet. In addition, the correction chart sheet can be output by the printer section.

Moreover, the scope of the present invention is not limited to what is described in the above embodiment, and is intended to cover all variations or modifications that do not depart from the spirit of the present invention.

According to an aspect of the preferred embodiment of the present invention, there is provided an image processing device comprising:

a storage part to store a target value set for each tone value in a plurality of colors, for each of the colors;

a measurement value information obtaining part to obtain measurement value information for each of the colors, the measurement value information comprising a measurement value of a density at each of a plurality of measurement positions in a main scanning direction and in a sub-scanning direction, the measurement positions being set for each tone value;

a correction target value calculation part to correct the target value based on color mixture proportion information in which a proportion of the plurality of colors is set for each tone value, and to calculate a correction target value for each tone value for each color;

a correction value calculation part to calculate a correction value of the density at each measurement position in the main scanning direction and in the sub-scanning direction set for each tone value, the correction value being calculated for each color based on the correction target value and the measurement value information; and a correction part to correct a density value of each color of each pixel in image data, based on the correction value of the density for each color, calculated by the correction value calculation part.

According to another aspect of the preferred embodiment of the present invention, there is provided an image processing method comprising:

obtaining of measurement value information for each of colors, the measurement value information comprising a measurement value of a density at each of a plurality of measurement positions in a main scanning direction and in a sub-scanning direction, the measurement positions being set for each tone value;

calculating of a correction target value to correct a target value set for each tone value for each color based on color mixture proportion information in which a proportion of the plurality of colors is set for each tone value, and to calculate the correction target value for each tone value for each color;

calculating of a correction value of the density at each measurement position in the main scanning direction and in the sub-scanning direction set for each tone value, the correction value being calculated for each color based on the correction target value and the measurement value information; and correcting a density value of each color of each pixel in image data, based on the correction value of the density for each color, calculated by the calculating of the correction value.

According to the image processing device or the image processing method, the density unevenness in the image comprising each color can be corrected without disturbing the coloration balance in the color mixture generated by the plurality of colors, which is the balance of the color mixture proportion in the plurality of colors.

Preferably, the image processing device further comprises a color conversion unit which includes the color mixture proportion information, to perform color conversion processing for the image data based on the color mixture proportion information in which the proportion of the plurality of colors is set for each tone value among a plurality of tone values which are set in advance, wherein the correction part corrects the density value of each color of each pixel in the image data which has been subjected to the color conversion processing by the color conversion unit, based on the correction value of the density for each color calculated by the correction value calculation part.

Preferably, the image processing method further comprises color converting to perform color conversion processing for the image data based on the color mixture proportion information in which the proportion of the plurality of colors is set for each tone value among a plurality of tone values which are set in advance, wherein in the correcting, the density value of each color of each pixel in the image data which has been subjected to the color conversion processing by the color converting is corrected, based on the correction value of the density for each color calculated by the calculating of the correction value.

Further, the density value of each color of each pixel in the image data which has been subjected to the color conversion processing based on the color mixture proportion information can be corrected based on the correction value of the density for each color calculated by the correction value calculation part.

Preferably, the correction value calculation part calculates a difference value between the correction target value of each tone value and the measurement value of the density at each measurement position in the main scanning direction and in the sub-scanning direction set for each tone value, for each color, to obtain the calculated difference value for each color as the correction value of the density for each color at each measurement position in the main scanning direction and in the sub-scanning direction set for each tone value.

Preferably, the calculating of the correction value calculates a difference value between the correction target value of each tone value and the measurement value of the density at each measurement position in the main scanning direction and in the sub-scanning direction set for each tone value, for each color, to obtain the calculated difference value for each color as the correction value of the density for each color at each measurement position in the main scanning direction and in the sub-scanning direction set for each tone value.

Further, the density value can be corrected for each color for each pixel according to the position of the pixel in the main scanning direction and in the sub-scanning direction in the image data for each color, thereby the correction for unevenness can be improved to have higher accuracy.

Preferably, the correction target value calculation part calculates an adjustment value to respectively adjust the target value set for each tone value for each color, based on the color mixture proportion information; and multiplies the target value set for each tone value by the adjustment value to calculate the correction target value for each tone value, for each color.

Preferably, the calculating of the correction target value calculates an adjustment value to respectively adjust the target value set for each tone value for each color, based on the color mixture proportion information; and multiplies the target value set for each tone value by the adjustment value to calculate the correction target value for each tone value, for each color.

Further, the target value for each tone value is multiplied by the adjustment value of the target value for each tone value based on the color mixture proportion information, for each color, thereby the correction target value for each tone value can be calculated for each color.

Preferably, the correction target value calculation part calculates a tone average value for each tone value based on the measurement value information, for each color;

determines a color having the tone average value which is the nearest to the target value of each color as a standard color for each tone value; and calculates the adjustment value to respectively adjust the target value set for each tone value, based on the color mixture proportion information, in a state where the standard color for each tone value is set as a standard, for each color.

Further, the adjustment value of the target value for each tone value can be calculated for each color based on the color mixture proportion information, in a state where the standard color which is the color having the tone average value nearest to the target value of each color for each tone value is set as the standard.

Preferably, the correction target value calculation part calculates the adjustment value to respectively adjust the target value set for each tone value, based on the color mixture proportion information, in a state where a standard color which is predetermined for each tone value is set as a standard, for each color.

Further, the adjustment value of the target value for each tone value can be calculated for each color, in a state where the standard color which is predetermined for each tone value is set as the standard.

Preferably, the image processing device further comprises an input unit to receive an input of adjustment value information to calculate an adjustment value for each color so as to respectively adjust the target value set for each tone value, wherein when the adjustment value information is input from the input unit, the correction target value calculation part calculates the adjustment value to respectively adjust the target value set for each tone value based on the adjustment value information for each color; multiplies the target value set for each tone value by the calculated adjustment value; and calculates the correction target value for each tone value, for each color.

Preferably, the image processing method further comprises inputting to receive an input of adjustment value information to calculate an adjustment value for each color so as to respectively adjust the target value set for each tone value, wherein when the adjustment value information is input from the inputting, the calculating of the correction target value calculates the adjustment value to respectively adjust the target value set for each tone value based on the adjustment value information for each color; multiplies the target value set for each tone value by the calculated adjustment value; and calculates the correction target value for each tone value, for each color.

Further, the target value of each tone value may be multiplied by the adjustment value of the target value for each tone value which is calculated based on the adjustment value information input from the input unit, thereby the correction target value for each tone value can be calculated for each color.

Preferably, when a relationship between the correction target value of a given tone value and the correction target values of tone values adjacent to the given tone value is equivalent or is in a converse relation, among the correction target value for each tone value, the correction target value calculation part corrects the correction target value so that a difference of not less than one tone value is to be generated.

Preferably, when a relationship between the correction target value of a given tone value and the correction target values of tone values adjacent to the given tone value is equivalent or is in a converse relation, among the correction target value for each tone value, the calculating of the correction target value corrects the correction target value so that a difference of not less than one tone value is to be generated.

Further, after the target value is corrected, the correction target value can be calculated in the same order as the order of each tone value of each color. Further, the correction target value of each tone value can be prevented from being equivalent or in converse relation with the correction target values of the adjacent tone values, thereby the tone density variation of the correction target values may be smoothed.

Preferably, a correction chart sheet is a sheet on which a correction chart image is formed, where a patch image having the same tone value is respectively disposed at each of the measurement positions in the main scanning direction and in the sub-scanning direction, for each color, and the measurement value information is the density of the patch image at each of the measurement positions in the main scanning direction and in the sub-scanning direction, measured as the measurement value for each correction chart sheet.

Further, the measurement value for each tone value for each color can be obtained at each of the plurality of measurement positions in the main scanning direction and in the sub-scanning direction.

Preferably, the correction part calculates the correction value of the density of each color of each pixel placed in a position in the main scanning direction and in the sub-scanning direction in the image data which has been subjected to the color conversion processing by the color conversion unit, by executing linear interpolation processing in which the correction value of the density of each color at each measurement position in the main scanning direction and in the sub-scanning direction set for each tone value is used.

Preferably, the correcting calculates the correction value of the density of each color of each pixel placed in a position in the main scanning direction and in the sub-scanning direction in the image data which has been subjected to the color conversion processing by the color converting, by executing linear interpolation processing in which the correction value of the density of each color at each measurement position in the main scanning direction and in the sub-scanning direction set for each tone value is used.

Further, the correction value of the density corresponding to the position of the pixel in the main scanning direction and in the sub-scanning direction of each color in the image data can be calculated for each color, by executing the linear interpolation processing in which the correction value of the density in each measurement position set for each tone value in the main scanning direction and in the sub-scanning direction is used.

Preferably, a correction chart sheet is a sheet on which a correction chart image is formed, where a patch image having the same tone value is respectively disposed at each of the measurement positions in the main scanning direction and in the sub-scanning direction, for each color, and the image processing device further comprises a measurement unit to measure the density of the patch image at each of the measurement positions in the main scanning direction and in the sub-scanning direction as the measurement value for each correction chart sheet; and to output a measurement result to the measurement value information obtaining part for each color as the measurement value information.

Further, the measurement results of the density of the patch images at each measurement position in the main scanning direction and in the sub-scanning direction in the correction chart sheet for each color can be obtained as the measurement value information for each color by the measurement unit.

According to still another aspect of the preferred embodiment of the present invention, there is provided an image forming apparatus comprising:

an image forming section to form a correction chart image on a sheet, in which a patch image having the same tone value is respectively disposed at each of the measurement positions in the main scanning direction and in the sub-scanning direction, and to output the sheet as a correction chart sheet for each color; and the image processing device.

According to the image forming apparatus, an image forming apparatus comprising an image forming section to output the correction chart sheet can be realized.

The present U.S. patent application claims a priority under the Paris Convention of Japanese patent application No. 2009-108986 filed on Apr. 28, 2009, which shall be a basis of correction of an incorrect translation.

What is claimed is:

1. An image processing device comprising:
   a storage part to store a target value set for each tone value in a plurality of colors, for each of the colors;
   a measurement value information obtaining part to obtain measurement value information for each of the colors, the measurement value information comprising a measurement value of a density at each of a plurality of measurement positions in a main scanning direction and in a sub-scanning direction, the measurement positions being set for each tone value;
   a correction target value calculation part that corrects the target value based on color mixture proportion information in which a proportion of densities of the plurality of colors based on gray balance is set for each tone value, and calculates a correction target value for each tone value for each color;
   a correction value calculation part to calculate a correction value of the density at each measurement position in the main scanning direction and in the sub-scanning direction set for each tone value, the correction value being calculated for each color based on the correction target value and the measurement value information; and
   a correction part to correct a density value of each color of each pixel in image data, based on the correction value of the density for each color, calculated by the correction value calculation part.

2. The image processing device as claimed in claim 1, further comprising a color conversion unit which includes the color mixture proportion information, to perform color conversion processing for the image data based on the color mixture proportion information in which the proportion of the plurality of colors is set for each tone value among a plurality of tone values which are set in advance,
   wherein the correction part corrects the density value of each color of each pixel in the image data which has been subjected to the color conversion processing by the color conversion unit, based on the correction value of the density for each color calculated by the correction value calculation part.

3. The image processing device as claimed in claim 1, wherein the correction value calculation part calculates a difference value between the correction target value of each tone value and the measurement value of the density at each measurement position in the main scanning direction and in the sub-scanning direction set for each tone value, for each color, to obtain the calculated difference value for each color as the correction value of the density for each color at each measurement position in the main scanning direction and in the sub-scanning direction set for each tone value.

4. The image processing device as claimed in claim 1, wherein the correction target value calculation part calculates an adjustment value to respectively adjust the target value set for each tone value for each color, based on the color mixture proportion information; and multiplies the target value set for each tone value by the adjustment value to calculate the correction target value for each tone value, for each color.

5. The image processing device as claimed in claim 4, wherein the correction target value calculation part calculates a tone average value for each tone value based on the measurement value information, for each color; determines a color having the tone average value which is the nearest to the target value of each color as a standard color for each tone value; and calculates the adjustment value to respectively adjust the target value set for each tone value, based on the color mixture proportion information in a state where the standard color for each tone value is set as a standard, for each color.

6. The image processing device as claimed in claim 4, wherein the correction target value calculation part calculates the adjustment value to respectively adjust the target value set for each tone value, based on the color mixture proportion information, in a state where a standard color which is predetermined for each tone value is set as a standard, for each color.

7. The image processing device as claimed in claim 1, further comprising an input unit to receive an input of adjustment value information to calculate an adjustment value for each color so as to respectively adjust the target value set for each tone value, wherein when the adjustment value information is input from the input unit, the correction target value calculation part
 calculates the adjustment value to respectively adjust the target value set for each tone value based on the adjustment value information for each color;
 multiplies the target value set for each tone value by the calculated adjustment value; and
 calculates the correction target value for each tone value, for each color.

8. An image processing device comprising:
 a storage part that stores a target value set for each tone value in a plurality of colors, for each of the colors;
 a measurement value information obtaining part that obtains measurement value information for each of the colors, the measurement value information comprising a measurement value of a density at each of a plurality of measurement positions in a main scanning direction and in a sub-scanning direction, the measurement positions being set for each tone value;
 a correction target value calculation part that corrects the target value based on color mixture proportion information in which a proportion of the plurality of colors is set for each tone value, and that calculates a correction target value for each tone value for each color;
 a correction value calculation part that calculates a correction value of the density at each measurement position in the main scanning direction and in the sub-scanning direction set for each tone value, the correction value being calculated for each color based on the correction value being calculated for each color based on the correction target value and the measurement value information; and
 a correction part that corrects a density value of each color of each pixel in image data, based on the correction value of the density for each color, calculated by the correction value calculation part,
 wherein when a relationship between the correction target value of a given tone value and the correction target values of tone values adjacent to the given tone value is equivalent or is in a converse relation, among the correction target value for each tone value, the correction target value calculation part corrects the correction target value so that a difference of not less than one tone value is to be generated.

9. An image processing device comprising:
 a storage part that stores a target value set for each tone value in a plurality of colors, for each of the colors;
 a measurement value information obtaining part that obtains measurement value information for each of the colors, the measurement value information comprising a measurement value of a density at each of a plurality of measurement positions in a main scanning direction and in a sub-scanning direction, the measurement positions being set for each tone value;
 a correction target value calculation part that corrects the target value based on color mixture proportion information in which a proportion of the plurality of colors is set for each tone value, and that calculates a correction target value for each tone value for each color;
 a correction value calculation part that calculates a correction value of the density at each measurement position in the main scanning direction and in the sub-scanning direction set for each tone value, the correction value being calculated for each color based on the correction target value and the measurement value information; and
 a correction part that corrects a density value of each color of each pixel in image data, based on the correction value of the density for each color, calculated by the correction value calculation part,
 wherein a correction chart sheet is a sheet on which a correction chart image is formed, where a patch image having the same tone value is respectively disposed at each of the measurement positions in the main scanning direction and in the sub-scanning direction, for each color, and the measurement value information is the density of the patch image at each of the measurement positions in the main scanning direction and in the sub-scanning direction, measured as the measurement value for each correction chart sheet.

10. The image processing device as claimed in claim 2, wherein the correction part calculates the correction value of the density of each color of each pixel placed in a position in the main scanning direction and in the sub-scanning direction in the image data which has been subjected to the color conversion processing by the color conversion unit, by executing linear interpolation processing in which the correction value of the density of each color at each measurement position in the main scanning direction and in the sub-scanning direction set for each tone value is used.

11. An image processing device comprising:
 a storage part that stores a target value set for each tone value in a plurality of colors, for each of the colors;
 a measurement value information obtaining part that obtains measurement value information for each of the colors, the measurement value information comprising a measurement value of a density at each of a plurality of measurement positions in a main scanning direction and in a sub-scanning direction, the measurement positions being set for each tone value;
 a measurement unit that:
  measures the density of a patch image at each of the measurement positions in the main scanning direction and in the sub-scanning direction as the measurement value for each correction chart sheet, the correction chart sheet being a sheet on which a correction chart image is formed, where the patch image having the same tone value is respectively disposed at each of the measurement positions in the main scanning direction and in the sub-scanning direction, for each color; and
outputs a measurement result to the measurement value information obtaining part for each color as the measurement value information;
a correction target value calculation part that corrects the target value based on color mixture proportion information in which a proportion of the plurality of colors is set for each tone value, and that calculates a correction target value for each tone value for each color;
a correction value calculation part that calculates a correction value of the density at each measurement position in the main scanning direction and in the sub-scanning direction set for each tone value, the correction value being calculated for each color based on the correction target value and the measurement value information; and
a correction part that corrects a density value of each color of each pixel in image data, based on the correction value of the density for each color, calculated by the correction value calculation part.

12. An image forming apparatus comprising:
an image forming section to form a correction chart image on a sheet, in which a patch image having the same tone value is respectively disposed at each of the measurement positions in the main scanning direction and in the sub-scanning direction, and to output the sheet as a correction chart sheet for each color; and
an image processing device comprising:
    a storage part that stores a target value set for each tone value in a plurality of colors, for each of the colors;
    a measurement value information obtaining part that obtains measurement value information for each of the colors, the measurement value information comprising a measurement value of a density at each of the plurality of measurement positions in a main scanning direction and in a sub-scanning direction, the measurement positions being set for each tone value;
    a correction target value calculation part that corrects the target value based on color mixture proportion information in which a proportion of the plurality of colors is set for each tone value, and that calculates a correction target value for each tone value for each color;
    a correction value calculation part that calculates a correction value of the density at each measurement position in the main scanning direction and in the sub-scanning direction set for each tone value, the correction value being calculated for each color based on the correction target value and the measurement value information; and
    a correction part that corrects a density value of each color of each pixel in image data, based on the correction value of the density for each color, calculated by the correction value calculation part.

13. An image processing method comprising:
obtaining measurement value information for each of colors, the measurement value information comprising a measurement value of a density at each of a plurality of measurement positions in a main scanning direction and in a sub-scanning direction, the measurement positions being set for each tone value;
calculating a correction target value that corrects a target value set for each tone value for each color based on color mixture proportion information in which a proportion of densities of the plurality of colors based on gray balance is set for each tone value, and that calculates the correction target value for each tone value for each color;
calculating a correction value of the density at each measurement position in the main scanning direction and in the sub-scanning direction set for each tone value, the correction value being calculated for each color based on the correction target value and the measurement value information; and
correcting a density value of each color of each pixel in image data, based on the correction value of the density for each color, calculated by the calculating of the correction value.

14. The image processing method as claimed in claim 13, further comprising color converting to perform color conversion processing for the image data based on the color mixture proportion information in which the proportion of the plurality of colors is set for each tone value among a plurality of tone values which are set in advance, wherein in the correcting, the density value of each color of each pixel in the image data which has been subjected to the color conversion processing by the color converting is corrected, based on the correction value of the density for each color calculated by the calculating of the correction value.

15. The image processing method as claimed in claim 13, wherein the calculating of the correction value calculates a difference value between the correction target value of each tone value and the measurement value of the density at each measurement position in the main scanning direction and in the sub-scanning direction set for each tone value, for each color, to obtain the calculated difference value for each color as the correction value of the density for each color at each measurement position in the main scanning direction and in the sub-scanning direction set for each tone value.

16. The image processing method as claimed in claim 13, wherein the calculating of the correction target value calculates an adjustment value to respectively adjust the target value set for each tone value for each color, based on the color mixture proportion information; and
    multiplies the target value set for each tone value by the adjustment value to calculate the correction target value for each tone value, for each color.

17. The image processing method as claimed in claim 13, further comprising inputting to receive an input of adjustment value information to calculate an adjustment value for each color so as to respectively adjust the target value set for each tone value,
    wherein when the adjustment value information is input from the inputting, the calculating of the correction target value calculates the adjustment value to respectively adjust the target value set for each tone value based on the adjustment value information for each color; multiplies the target value set for each tone value by the calculated adjustment value; and calculates the correction target value for each tone value, for each color.

18. An image processing method comprising:
obtaining measurement value information for each of colors, the measurement value information comprising a measurement value of a density at each of a plurality of measurement positions in a main scanning direction and in a sub-scanning direction, the measurement positions being set for each tone value;
calculating a correction target value to correct a target value set for each tone value for each color based on color mixture proportion information in which a proportion of the plurality of colors is set for each tone value, and to calculate the correction target value for each tone value for each color;

calculating a correction value of the density at each measurement position in the main scanning direction and in the sub-scanning direction set for each tone value, the correction value being calculated for each color based on the correction target value and the measurement value information; and correcting a density value of each color of each pixel in image data, based on the correction value of the density for each color, calculated by the calculating of the correction value, wherein when a relationship between the correction target value of a given tone value and the correction target values of tone values adjacent to the given tone value is equivalent or is in a converse relation, among the correction target value for each tone value, the calculating of the correction target value corrects the correction target value so that a difference of not less than one tone value is to be generated.

19. An image processing method comprising:

obtaining measurement value information for each of colors, the measurement value information comprising a measurement value of a density at each of a plurality of measurement positions in a main scanning direction and in a sub-scanning direction, the measurement positions being set for each tone value;

calculating a correction target value to correct a target value set for each tone value for each color based on color mixture proportion information in which a proportion of the plurality of colors is set for each tone value, and to calculate the correction target value for each tone value for each color;

calculating a correction value of the density at each measurement position in the main scanning direction and in the sub-scanning direction set for each tone value, the correction value being calculated for each color based on the correction target value and the measurement value information; and correcting a density value of each color of each pixel in image data, based on the correction value of the density for each color, calculated by the calculating of the correction value, wherein a correction chart sheet is a sheet on which a correction chart image is formed, where a patch image having the same tone value is respectively disposed at each of the measurement positions in the main scanning direction and in the sub-scanning direction, for each color, and the measurement value information is the density of the patch image at each of the measurement positions in the main scanning direction and in the sub-scanning direction, measured as the measurement value for each correction chart sheet.

20. The image processing method as claimed in claim 14, wherein the correcting calculates the correction value of the density of each color of each pixel placed in a position in the main scanning direction and in the sub-scanning direction in the image data which has been subjected to the color conversion processing by the color converting, by executing linear interpolation processing in which the correction value of the density of each color at each measurement position in the main scanning direction and in the sub-scanning direction set for each tone value is used.

21. The image forming apparatus as claimed in claim 12, further comprising a color conversion unit which includes the color mixture proportion information, to perform color conversion processing for the image data based on the color mixture proportion information in which the proportion of the plurality of colors is set for each tone value among a plurality of tone values which are set in advance, wherein the correction part corrects the density value of each color of each pixel in the image data which has been subjected to the color conversion processing by the color conversion unit, based on the correction value of the density for each color calculated by the correction value calculation part.

22. The image forming apparatus as claimed in claim 12, wherein the correction value calculation part calculates a difference value between the correction target value of each tone value and the measurement value of the density at each measurement position in the main scanning direction and in the sub-scanning direction set for each tone value, for each color, to obtain the calculated difference value for each color as the correction value of the density for each color at each measurement position in the main scanning direction and in the sub-scanning direction set for each tone value.

23. The image forming apparatus as claimed in claim 12, wherein the correction target value calculation part:

calculates an adjustment value to respectively adjust the target value set for each tone value for each color, based on the color mixture proportion information; and multiplies the target value set for each tone value by the adjustment value to calculate the correction target value for each tone value, for each color.

24. The image forming apparatus as claimed in claim 23, wherein the correction target value calculation part:

calculates a tone average value for each tone value based on the measurement value information, for each color;

determines a color having the tone average value which is the nearest to the target value of each color as a standard color for each tone value; and calculates the adjustment value to respectively adjust the target value set for each tone value, based on the color mixture proportion information, in a state where the standard color for each tone value is set as a standard, for each color.

25. The image forming apparatus as claimed in claim 23, wherein the correction target value calculation part calculates the adjustment value to respectively adjust the target value set for each tone value, based on the color mixture proportion information, in a state where a standard color which is predetermined for each tone value is set as a standard, for each color.

26. The image forming apparatus as claimed in claim 12, further comprising an input unit to receive an input of adjustment value information to calculate an adjustment value for each color so as to respectively adjust the target value set for each tone value, wherein when the adjustment value information is input from the input unit, the correction target value calculation part calculates the adjustment value to respectively adjust the target value set for each tone value based on the adjustment value information for each color; multiplies the target value set for each tone value by the calculated adjustment value; and calculates the correction target value for each tone value, for each color.

27. The image forming apparatus as claimed in claim 12, wherein when a relationship between the correction target value of a given tone value and the correction target values of tone values adjacent to the given tone value is equivalent or is in a converse relation, among the correction target value for each tone value, the correction target value calculation part corrects the correction target value so that a difference of not less than one tone value is to be generated.

28. The image forming apparatus as claimed in claim 12, wherein
the correction chart sheet comprises sheets on which a correction chart images are formed, where a patch image having the same tone value is respectively disposed at each of the measurement positions in the main scanning direction and in the sub-scanning direction, for each color, and
the measurement value information comprises the density of the patch image at each of the measurement positions in the main scanning direction and in the sub-scanning direction, measured as the measurement value for each correction chart sheet.

29. The image forming apparatus as claimed in claim 21, wherein the correction part calculates the correction value of the density of each color of each pixel placed in a position in the main scanning direction and in the sub-scanning direction in the image data which has been subjected to the color conversion processing by the color conversion unit, by executing linear interpolation processing in which the correction value of the density of each color at each measurement position in the main scanning direction and in the sub-scanning direction set for each tone value is used.

30. The image forming apparatus as claimed in claim 12, wherein
the correction chart sheet comprises sheets on which correct images are formed, where a patch image having the same tone value respectively disposed at each of the measurement positions in the main scanning direction and in the sub-scanning direction, for each color, and
the image processing device further comprises a measurement unit that:
measures the density of the patch image at each of the measurement positions in the main scanning direction and in the sub-scanning direction as the measurement value for each correction chart sheet; and
outputs a measurement result to the measurement value information obtaining part for each color as the measurement value information.

* * * * *